April 22, 1941.    F. LIENEWEG    2,238,903
ELECTRODE FOR MEASURING THE CONDUCTIVITY OF LIQUIDS
Filed March 10, 1937
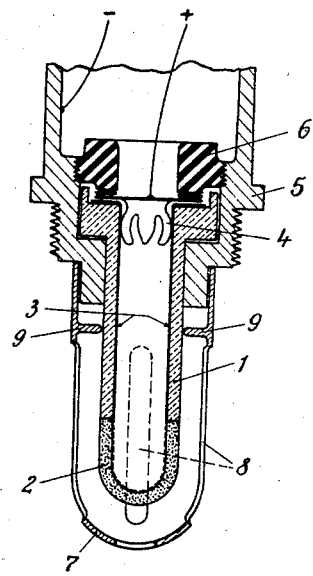
Fritz Lieneweg
Inventor
by Knight
Attys.

Patented Apr. 22, 1941

2,238,903

UNITED STATES PATENT OFFICE 2,238,903

ELECTRODE FOR MEASURING THE CONDUCTIVITY OF LIQUIDS

Fritz Lieneweg, Berlin-Siemensstadt, Germany

Application March 10, 1937, Serial No. 130,104
In Germany June 3, 1936

7 Claims. (Cl. 204—195)

My invention relates to a method and means for measuring the electric conductivity of liquids by the use of two electrodes immersed in the liquid to be tested.

An object of my invention is to eliminate the effect of polarization on direct-current electrodes.

Another object of my invention is to make possible a very accurate determination of the conductivity and of the percentage of salt of liquids flowing and at rest.

The polarization is due to the fact that a counter E. M. F. is effective on the electrodes owing to the formation of an oxy-hydrogen element. This counter E. M. F. must be annulled by removing immediately the oxygen when being formed on the electrode. This is possible by reducing the separated oxygen with the aid of hydrogen.

Accordingly, the present application describes a method and means for the determination of the conductivity of liquids by means of direct current, whereby a polarization is absolutely eliminated. The essence of the invention lies in the fact that at least one electrode on which oxygen would deposit or both electrodes, during the passage of the electric current, are brought into contact with a substance which possesses a hydrogen pressure sufficient to reduce the oxygen depositing on either electrode.

The use of gaseous hydrogen may cause difficulties encountered by the necessity of a continuous gas supply, and may under circumstances also result in errors, since the hydrogen passing the electrode would continuously impair the flow of the electric current and, therefore, influence the measurement.

All solid or liquid substances having any partial pressure of the hydrogen are, therefore, suitable for carrying out an accurate measurement; however, such substances are preferably employed which do not cause any ionic reactions affecting the measurement by changing the conductivity that is to say, substances of neutral molecules having a certain partial pressure of the hydrogen, such as for instance, quinhydrone whose hydrogen pressure amounts to about $10^{-24}$ atm. Besides, all reduction-oxydation systems which present a partial pressure of the hydrogen are suitable for this purpose such as, for instance indophenol, methylene blue etc.

Furthermore, electrolytes may be employed such as an aqueous solution of a mixture of $FeCl_3$ and $FeCl_2$. Since only very small quantities are, as a rule, necessary for the reduction of the oxygen, they can be so arranged that the conductivity caused by the addition of such electrolytes may be practically neglected with respect to the conductivity to be measured.

In order that the hydrogen of the quinhydrone may reduce the oxygen, the oxy-hydrogen-partial pressure produced on the electrodes by the flow of the electric current must be smaller than $10^{-48}$ and $10^{-24}$ atm.

In practice, it has been found that slight traces of quinhydrone which are added to the solution under test, prevent completely polarization when using platinum electrodes. For instance, an amount less than 1 mg substance is sufficient for one liter of solution. Instead of platinum, also less noble metals, such as gold, silver, iron-nickel alloys etc. may be employed as substances for electrodes which absorb the oxygen depositing on the electrode in such a manner that the oxygen reacts with the hydrogen of the material added thereto.

It must be noted that both in flowing water and particularly in water at rest the same constant values of conductivity are obtained. Furthermore, it has been found that also a heat treatment at temperatures up to 100 degrees Centigrade and more do not entail any change in the adjustment of the value to be measured, except the change in the conductivity of the solution itself caused by the higher temperature. Therefore, the invention enables obtaining always the same definite value for the same percentage of salt if the liquid to be tested is adjusted to a certain temperature.

Also by the use of strongly alkaline solutions in which already a conversion, for instance of the quinhydrone, takes place accurate measurements are obtained, since the absolute value and the constancy of the hydrogen pressure are not essential to the measurements.

To obtain a technically favorable type of a device for measuring the conductivity and the percentage of salt with admixtures which are to be used according to the invention it is less convenient to add continuously quinhydrone to the solution, than to impregnate one or both electrodes with quinhydrone. This may, for instance, be accomplished by filling the inner space of a permeable platinum electrode with quinhydrone which imparts to the platinum the necessary hydrogen pressure as the solution passes the electrode exteriorly. To this end, a hollow body consisting in part of porous material may be employed which is impregnated with platinum.

In the accompanying drawing an embodiment of my invention is shown in diagrammatic form.

A porcelain vessel 1 whose lower part 2 is porous and whose inner wall is provided with a platinum coating 3 is employed as an anode on which oxygen deposits owing to the passage of electric current through the anode. The porous part 2 contains platinum, which when manufacturing the device is applied by impregnating the porous portion with a platinizing liquid. The vessel serves for the reception of the reducing substance; for instance, of a thick quinhydrone paste and is closed by a covering plate 4. To establish a good contact with the platinum of the vessel the covering plate is designed in the form of a spring and platinized. The porcelain vessel filled up with the reducing substance is arranged in a holder 5 which may be screwed, for instance, into the conduit in which the salt percentage of water is to be determined. By tightening the screw 6 the vessel is rendered pressure-tight. A tube 7 having a threaded portion and consisting, for instance, of an iron-nickel alloy and which surrounds the anode in the form of a screen electrode is employed as a cathode. This tube is provided with longitudinal apertures 8 which permit the passage of the liquid to be measured and with a flange 9 which holds the porcelain vessel in position. Since the electrode 7 is electrically connected with the holder 5, the latter forms a circuit connection, that is, a ground connection when inserted into a conduit. By the platinization of the electrode metal as well as by the flange 9 and the design of the tube 7 in the form of a screen electrode, the production of a counter E. M. F. which might impair the measurement is prevented, although a metal differing from that of the anode is employed as an electrode.

The entire device may be easily assembled and taken apart for replacing the paste. Further, it has a compact construction and requires only very small amounts of pure platinum. Instead of platinum, other metals may be employed which are capable of permeating porous bodies or in solid form are sufficiently permeable to hydrogen.

It has been found that in an electrode designed in the above-described manner, the amount of quinhydrone lasts considerably long, since the consumption thereof is very slight.

The measurements may be carried out also by the use of known temperature compensating devices; for instance, of resistances with positive and negative temperature coefficients.

It will be understood that the invention is not limited to the embodiment shown. Many changes in the arrangement and construction will be obvious to those skilled in the art.

I claim as my invention:

1. In a device for measuring the electrical conductivity of liquids with the aid of direct current, an electrode carrier, an anode secured to said carrier and comprising a hollow body permeable to water, a depolarizing substance having a partial pressure of hydrogen, said substance being disposed within said body, and a grid-like cathode surrounding said anode and mounted on said carrier.

2. In a device for measuring the electrical conductivity of liquids with the aid of direct current, an electrode carrier, an anode comprising a cylindrical hollow body permeable to water, said body being closed at one end and secured to said carrier at the opposite end, a depolarizing substance having a partial pressure of hydrogen, said substance being disposed within said body, and a grid-like cathode surrounding said anode and mounted on said carrier, said carrier being provided with connection means for inserting it into a conduit of the liquid to be tested so that said electrodes are immersed into said liquid.

3. In a device for measuring the electrical conductivity of liquids with the aid of direct current, an electrode carrier, an anode consisting of a ceramic vessel having at least a portion of its wall porous and permeable to water and a chemically resistant metallic layer disposed on the inside wall of said vessel so as to permeate said porous wall portion, a depolarizing substance having a partial pressure of hydrogen, said substance being disposed within said vessel, and a grid-like cathode surrounding said anode and secured to said carrier.

4. In a device for measuring the electrical conductivity of liquids with the aid of direct current, an electrode carrier, a cylindrical hollow body of ceramic material being closed at one end and secured to said carrier at the other end, said body having a porous wall portion located near said closed end, a layer of noble metal disposed on the inner wall of said porous wall portion, a terminal conductively connected with said layer, a quinhydrone paste placed within said body and a grid-like electrode of chemically indifferent metal surrounding said body and being mounted on said carrier.

5. In a device for measuring the electrical conductivity of liquids with the aid of direct current, an electrode carrier, an anode consisting of a ceramic vessel having at least a portion of its wall porous and permeable to water and a chemically resistant metallic layer disposed on the inside wall of said vessel so as to permeate said porous wall portion, a depolarizing non-conductive substance having a partial pressure of the hydrogen, said substance being disposed within said vessel, and a grid-like cathode surrounding said vessel and secured to said carrier.

6. In a device for measuring the electrical conductivity of liquids with the aid of direct current, an electrode carrier, an anode consisting of a ceramic vessel having at least a portion of its wall porous and permeable to water and a chemically resistant metallic layer disposed on the inside wall of said vessel so as to permeate said porous wall portion, a depolarizing electrolyte having a partial pressure of the hydrogen, said electrolyte being disposed within said vessel, and a grid-like cathode surrounding said vessel and secured to said carrier.

7. An electrode for electrolytical measurements consisting of a ceramic vessel having at least a portion of its wall porous and permeable to water, a mechanically resistant metallic layer disposed on the wall of said vessel so as to permeate said porous wall portion, a depolarizing substance having a partial pressure of hydrogen, said substance being disposed within said vessel, a closure member covering the opening of said vessel, and a terminal conductively connected with said metallic layer.

FRITZ LIENEWEG.